United States Patent [19]
Golobay

[11] 4,051,416
[45] Sept. 27, 1977

[54] INCREMENTAL DIGITAL CONTROL CIRCUIT

[75] Inventor: Gary L. Golobay, Valley Center, Kans.

[73] Assignee: J. I. Case Company, Racine, Wis.

[21] Appl. No.: 690,383

[22] Filed: May 27, 1976

[51] Int. Cl.² .................................................. H02P 5/46
[52] U.S. Cl. ....................................... 318/85; 318/52; 180/6.5
[58] Field of Search ................. 318/85, 52, 72, 69; 180/6.5

[56] References Cited
U.S. PATENT DOCUMENTS

| | | | |
|---|---|---|---|
| 3,870,935 | 3/1975 | Abels et al. | 318/85 X |
| 3,970,160 | 7/1976 | Nowick | 318/85 X |
| 4,000,449 | 12/1976 | Gripp | 318/85 X |

Primary Examiner—B. Dobeck
Attorney, Agent, or Firm—Dressler, Goldsmith, Clement, Gordon & Shore Ltd.

[57] ABSTRACT

An incremental digital control system to effect incremental adjustments to an operating system. The control system is responsive to selective relationships between digital signals representative of operational characteristics for producing changes in control signals to effect the desired incremental adjustments.

14 Claims, 5 Drawing Figures

INCREMENTAL DIGITAL CONTROL CIRCUIT

BACKGROUND OF THE INVENTION

The present invention relates to an electronic control system for effecting incremental adjustments in a controlled operating system to effect synchronized operation thereof, and more particularly, for controlling the operation of a plurality of independently operated systems to effect a desired operating relationship therebetween.

There are many environments in which it is desired to utilize independent systems which are to be operated in synchronism. For example, construction and other heavy equipment are often propelled by power tracks as distinguished from wheels. One advantage of such configurations is that the use of tracks allows the vehicle to maneuver under conditions and in locations normally inaccessible to wheeled vehicles. Furthermore, if the tracks can be driven independently, the vehicle is exceptionally mobile and maneuverable.

When independently driven systems are used, however, it is often necessary to continually adjust the manual controls when operating the vehicle in a straight line since independent systems may respond differently to identical conditions, for a variety of reasons. It would be desirable, therefore, to be able to adjust at least one of the two independent systems so that within a reasonable amount of time the systems do, in fact, operate in synchronism, e.g., at the same speed, when it is desired to do so, and at the same time allow the independent systems to operate independently when necessary.

SUMMARY OF THE INVENTION

In accordance with the present invention there is provided a digital control system for effecting adjustment of independent operating systems and more particularly for effecting incremental adjustment of independent systems to produce synchronized operation thereof.

A control system in accordance with the present invention provides means for sensing a condition of the operation of the systems to be controlled, e.g., sensing the output speed of such systems, and for effecting incremental adjustment to at least one of the systems to produce the desired synchronized operation thereof.

A control system in accordance with the present invention is responsive to a digital signal having a characteristic representative of the characteristic to be controlled for producing control signals to effect the desired incremental adjustment of the operating systems.

The control system of the present invention is responsive to selected relationship between such digital signals to produce the desired control signals to effect adjustment of one of the control systems, a dependent system, until the operating characteristic of the dependent system has achieved a desired relationship to that of the independent or reference system.

The control system incorporating the present invention includes circuitry for selection of an appropriate control signal as a function of the existing control signals and as a function of the relationship between the operating systems to be controlled, to produce the desired synchronized operation as rapid as possible while minimizing the number of changes in control signals in order to minimize hunting effects.

The control system of the present invention is simple, reliable and provides the desired control function while minimizing the number of adjustments required as the operation of the control system stabilizes, and at the same time allows independent operation of the systems when called for. Such a control system is capable of compensating for variations which may arise for a variety of reasons in the use of a control system in accordance with the present invention permits desired synchronized operation of independent systems without continuous manual adjustments to achieve desired operating characteristics of the system being controlled.

Numerous other advantages and features of the present invention will become readily apparent from the following detailed description of the invention and of one embodiment thereof, from the claims and from the accompanying drawing in which each and every detail shown is fully and completely disclosed as a part of this specification in which like numerals refer to like parts.

DETAILED DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Figure 1:
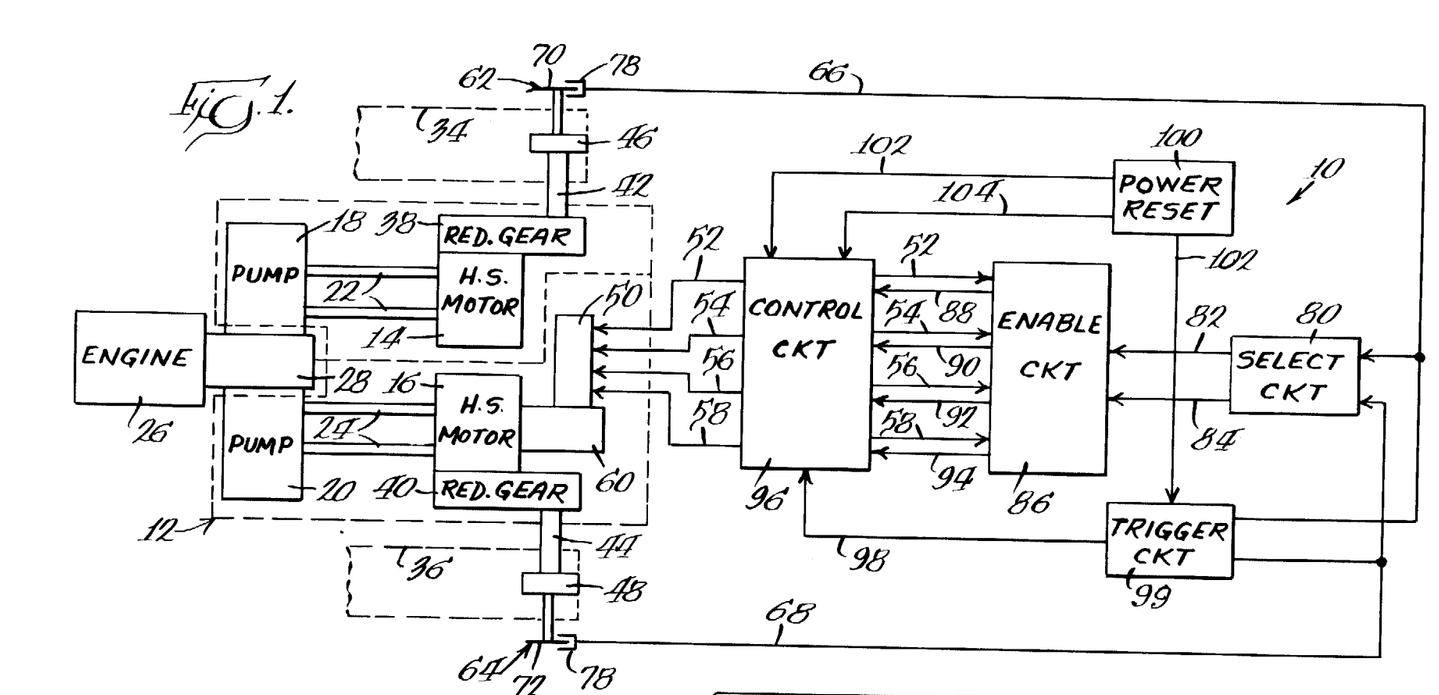
FIG. 1 is a block diagram of an operating system together with a control system incorporating the present invention.

In FIG. 1, a block diagram of digital control system 10 incorporating the present invention is shown in operational relationship with and for the control of an operating system shown as a hydrostatic drive system 12. The drive system 12 includes a pair of hydrostatic motors 14, 16, each driven by a hydrostatic pump 18, 20 through appropriate hydraulic conduits 22, 24. The hydrostatic pumps 18, 20 are driven by a power plant 26 through a suitable drive train 28.

The operation of each of the hydrostatic pumps 18, 20 and in turn, each of the corresponding hydrostatic motors 14, 16 connected thereto is manually controlled by control levers (not shown). If desired, such control levers may be coupled to a single monostick control member (not shown) as is well known.

In the disclosed embodiment, the hydrostatic systems form part of a ground drive system for a vehicle. As shown in FIG. 1, each of the hydrostatic motors 14, 16 drives a power track 34, 36 through an appropriate gear train 38, 40, drive shaft 42, 44 and track drive sprocket 46, 48.

The independent drive systems permit a great deal of flexibility in the operation of the vehicle allowing each track to be driven independently for spot turn capability and allows each of the tracks to be independently driven in either direction. When the control levers connected to the hydrostatic pump are incorporated as a part of, or connected to, a single monostick control, operation of the monostick in a forward or reverse direction is designed to operate the motors in synchronism and drive the tracks at equal speeds in either direction, thus propelling the vehicle in a straight line. Since the hydrostatic motors may respond somewhat differently to identical positions of the control levers, some means of incremental adjustment to at least one of the motors is necessary so that when such synchronized operation is desired, the two hydrostatic motors do drive the drive tracks at equal speeds.

Rather than continuously adjusting both motors in an attempt to match their operation, one of the hydrostatic motors, the independent motor 14, is used as a reference and the second hydrostatic motor, the independent motor 16, is adjusted in increments until the motors are operating in synchronism. The dependent or adjustable hydrostatic motor 16 is provided with an electric stepper motor 50 that operates in response to control signals on lines 52, 54, 56, 58 produced by the digital control system 10, as described in more detail below. The stepper motor 50 is connected to a swash plate (not shown) of the dependent or adjustable hydrostatic motor 16 through a suitable coupling gear mechanism 60, which may include worm and sector gears, to provide incremental adjustments of the swash plate. Adjustment of the swash plate adjusts the response of the hydrostatic motor 16 to the hydraulic input thereto until such time as both motors 14, 16 are operating in synchronism, as reflected by the two power tracks being driven at the same speed and the vehicle moving in a straight line.

Figure 2:
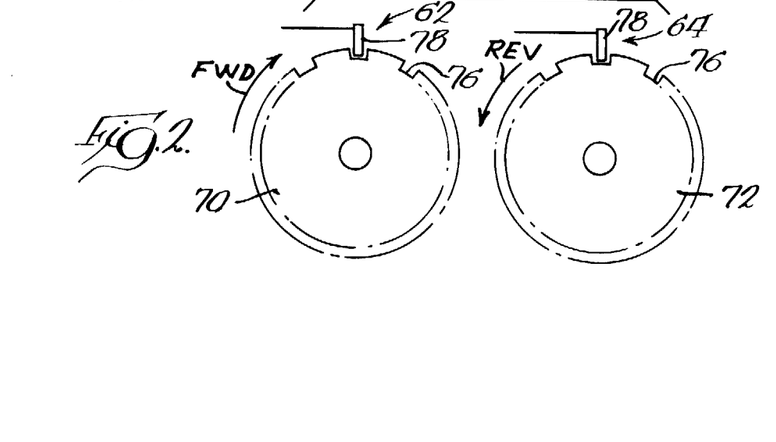
FIG. 2 is a diagrammatic view of transducers suitable for providing input signals to the control system of the present invention.

Transducers 62, 64 affixed to the output of the hydrostatic motors 14, 16 provide input signals on lines 66, 68, respectively, to the control system 10. The input signals are representative of the relative speed at which the power tracks 34, 36 are being operated. Each of the transducers 62, 64 includes a disc 70, 72, respectively, affixed to and rotatable with the track drive sprocket 46, 48 connected to each of the power tracks 34, 36. As seen in FIG. 2, the transducer discs 70, 72 are identical, and each comprises a circular plate with a plurality of equally spaced peripheral apertures or notches 76 disposed or cut into the perimeter of the disc. Each of the transducers 70, 72 further includes an optical switch 78 of the type in which light from a light-emitting diode (LED) is directed onto a suitable phototransistor. The LED and the phototransistor face each other across an air gap through which the transducer disc rotates, the light from the LED impinging on the phototransducer when the peripheral notches 76 in the disc pass therebetween. The resulting output 66, 68 of each of the transducers 62, 64 are digital pulse trains comprised of a series of pulses each of which is produced as a peripheral notch 76 in the transducer disc 70 or 72 passes through the optical transducer switch 78.

The control system 10 continuously produces a control signal on one of the control output lines 52, 54, 56, 58. The control signals are applied to the stepper motor 50. Changes in the control signal are produced when the relationship between pulse trains on lines 66, 68 indicate that the hydrostatic motors 14, 16 are not driving the power tracks 34, 36 in synchronism, e.g., at the same speed. The stepper motor 50 is responsive to changes in the control signals 52, 54, 56, 58 to incrementally adjust the hydrostatic motor swash plate and increase or decrease the speed at which the dependent hydrostatic motor 16 is driving the associated power track 36.

The control system 10 is selectively responsive to overlapping pulses in pulse trains 66, 68 for producing a change in the control signals as a function of which of the pulses is received first.

When pulses overlap, two possible situations are indicated. First, if the system from which the first pulse is received is the independent motor 14, it is running slower relatively than the other (e.g., dependent motor 16) and has allowed the second system to catch it. This requires a decrease in the speed of the second or dependent system. If the pulse from the second or dependent system is received before the pulse from the first or independent system, and the pulses overlap, the reverse situation exists. Under these conditions, the control pulses are changed to speed up the second or dependent system until the two systems are operating in synchronism.

The pulse trains 66, 68 produced by each of the transducers 62, 64 are applied to the input of a control pulse selection circuit 80. When conditions exist which require a change in the control pulse, the selection circuit produces a control selection signal on one of two output lines. A first or increase speed control selection signal 82 is produced when pulses overlap and the first of the overlapping pulses is received from the transducer 64 connected to the adjustable or dependent hydrostatic motor 16. A second decrease speed control selection signal 84 is produced when the pulses overlap and when the pulse received first is produced by the transducer 62 connected to the independent hydrostatic motor 14.

The control selection signals 82, 84 are applied to the inputs of an enabling circuit 86 which applies a selected control enabling signal 88, 90, 92, 94 to the control circuit 96. One of these enabling signals is produced as a function of both the selection signal 82 or 84 and the existing control signal 52, 54, 56 or 58. The stepper motor 50 is bidirectional and is responsive to changes in control signals rather than to a particular control signal produced. The enabled control circuit 96 produces a new control signal in response to a trigger pulse 98 produced by a trigger circuit 99, which also is responsive to the pulses produced by the transducers 62, 64. The trigger circuit produces a trigger pulse 98 in response to the absence of at least one pulse from at least one of the transducers.

In order to provide a reference for the system, a power on reset circuit 100 is provided which is responsive to energization of the system 10 to inhibit the trigger circuit 99 and provide initial enable and trigger signals 102, 104 to the control circuit 96 when the system is initially energized to produce a preselected one 52 of the control signals.

Figure 3:
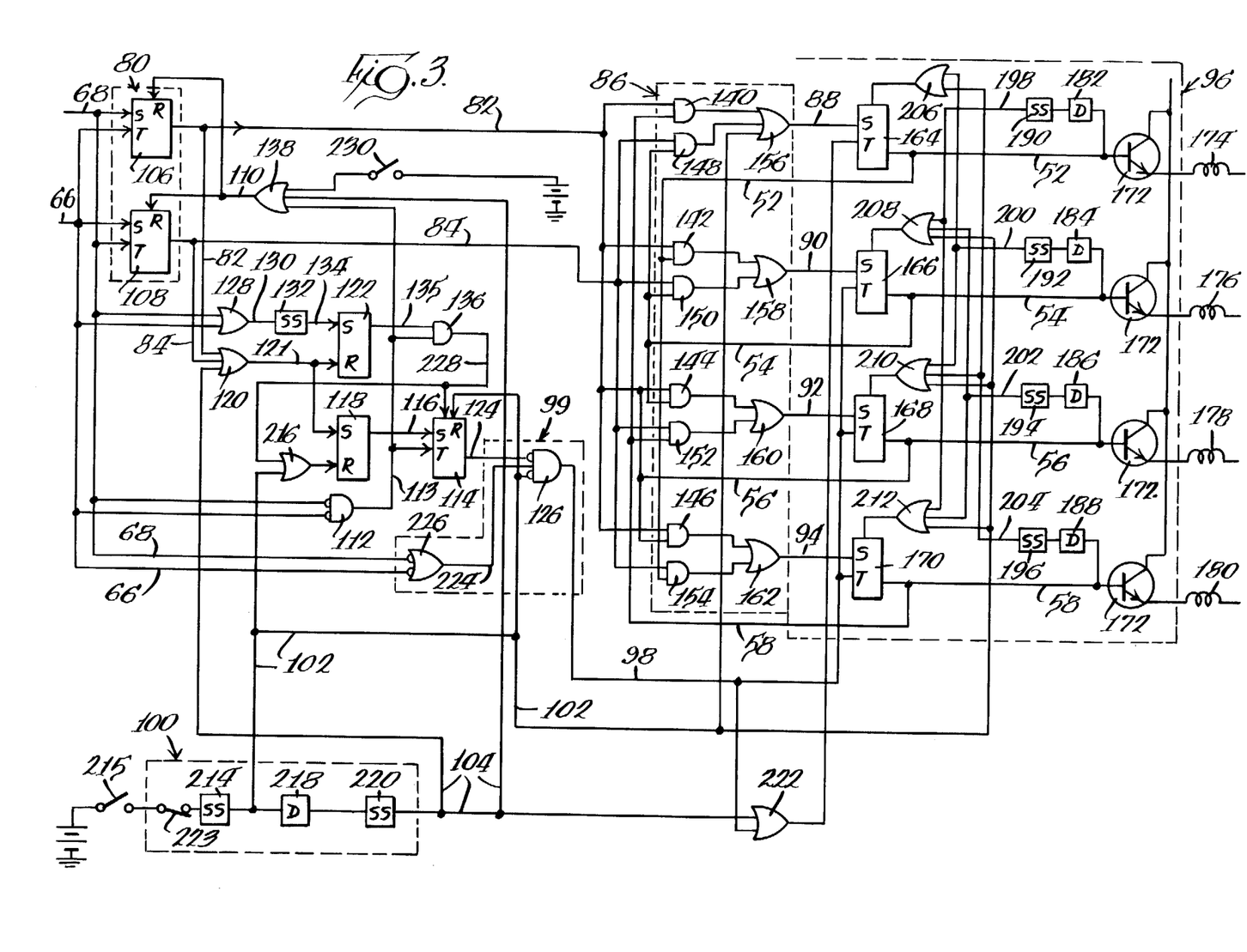
FIG. 3 is a block diagram of one embodiment of a control system incorporating the present invention.
Figure 4A:
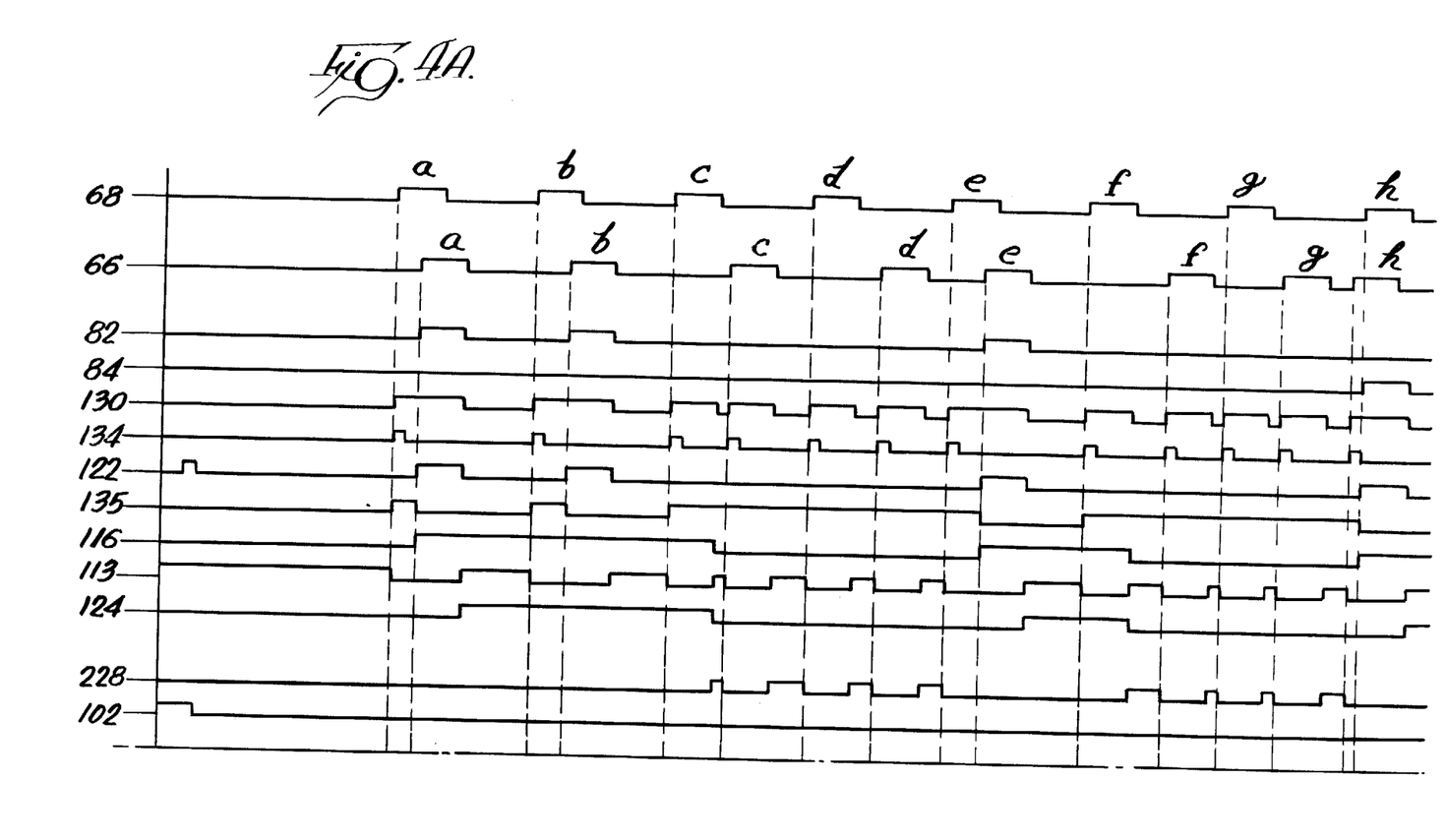
FIGS. 4A and 4B are timing diagrams helpful in understanding the operation of the control system of the present invention.
Figure 4B:
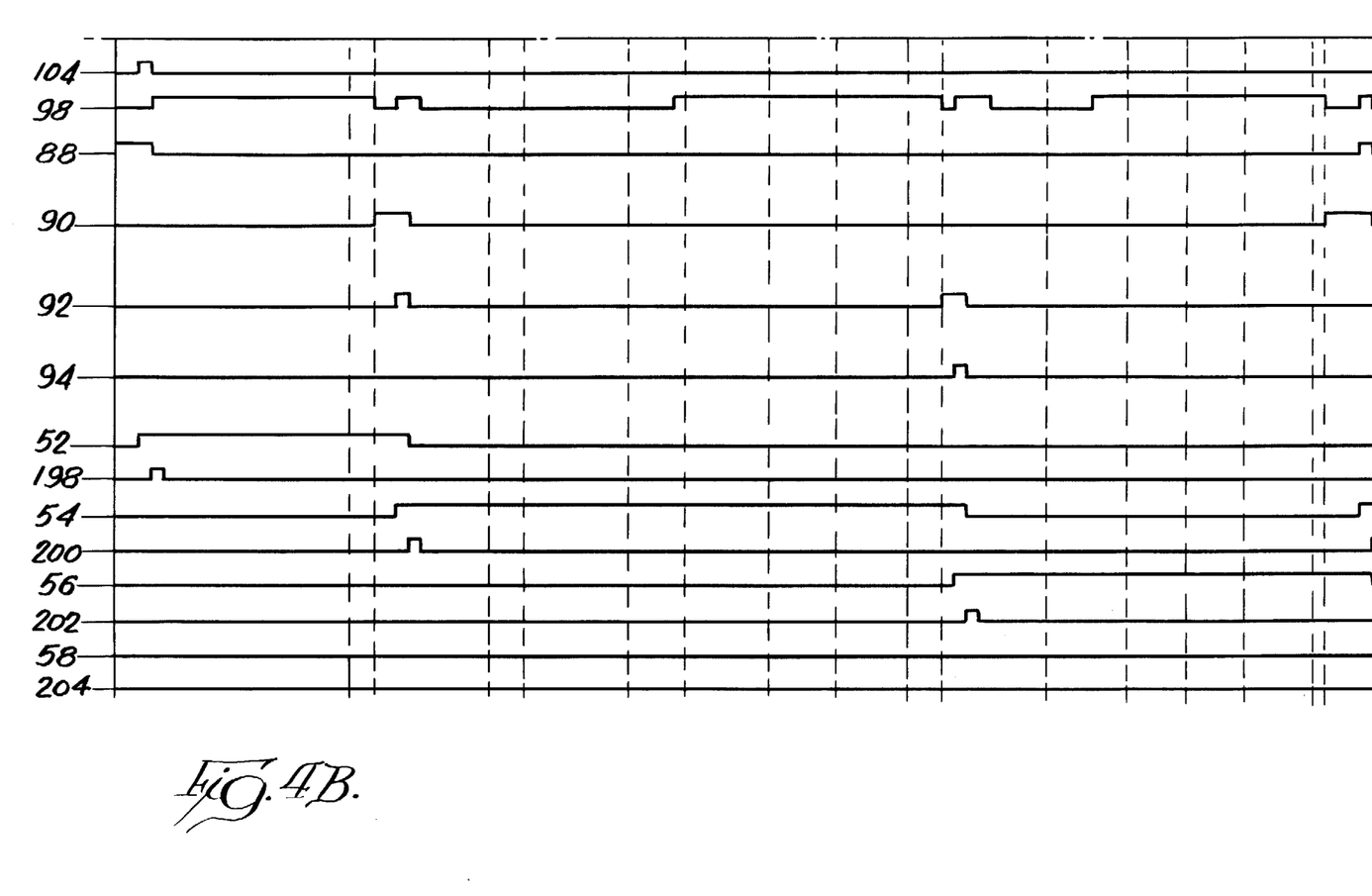

Referring to FIGS. 3 and 4, the digital pulse train 66 produced by the independent transducer 62 and the pulse train 68 produced by the dependent transducer 64 are shown on the first two lines of FIG. 4. These pulse trains are applied to the inputs of the control signal selection circuit 80 which comprises an increase selection circuit 106 and a decrease selection circuit 108. The selection circuits 106, 108 may be, for example, a pair of triggered flip flops, or any other type of circuit which produces an output in response to the transition of a trigger input from low to high or (from "0" to "1") when the signal at the set input is high ("1").

The independent pulse train 66 is applied to the set input 108S of the decrease selection circuit 108 and to the trigger input 106T of the increase selection circuit 106. The dependent pulse train 68 is applied to the trigger input 108T of the decrease selection circuit 108 and to the set input 106S of the increase selection circuit 106. It therefore can be appreciated that when one of the independent pulses 66 is applied to the selection circuit 80 prior to a dependent pulse 68, the set input 108S of the decrease circuit 108 goes to "1". When the pulses overlap and a dependent pulse 68 is received subsequent to the independent pulse 66, it is applied to the trigger input 108T of the decrease circuit 108 while the set input is still high to produce a decrease control selection signal 84. When a dependent pulse 68 is received prior to an independent pulse 66, the reverse occurs and an increase selection signal 84 is produced.

If pulses of the two pulse trains 66, 68 do not overlap, no selection signal is produced since the signals at the inputs 106S, 108S of both flip flops terminate before a pulse is applied to the trigger inputs 106T, 108T. A selection signal 82 or 84 persists until a reset signal on line 110 is applied to the reset inputs 106R, 108R.

In order to preclude the control system from continuously changing control pulses, thereby continuously adjusting the dependent motor 16, a change in control signals produced as a result of an overlap of pulses in the pulse trains 66, 68 only occurs after a non-overlap condition. This is accomplished by applying the pulse trains 66, 68 to the inhibit inputs of a no lock control AND gate 112, the output 113 of which is applied to the trigger input 114T of a no look control circuit 114 (e.g., a triggered flip flop). The set input 114S of the no look circuit 114 is the output 116 of a no look set latch 118, the output 116 being produced whenever one of the selection signals 82, 84 is produced.

As seen in FIG. 3, both selection signals 82, 84 are applied to the input of a reset OR gate 120, the output 121 of which is applied to the set input 118S of the no look set latch 118 and to the reset input 122R of a no look set latch 122. Whenever one of the selection signals 82, 84 is produced, the no look set latch 118 is set to produce the no look set signal 116. The no look circuit 114 produces a no look control signal 124. At a point in time when there are no pulses being produced by either of the transducers 62, 64 the output 113 of no look control AND gate 112 goes to "1" to trigger the no look circuit 114 which produces the no look signal 124 if the no look set latch 118 has been set. The no look signal 124 is applied to an inhibit input of a trigger AND gate 126 output of which is the trigger signal 98 which triggers the control circuit 96, when enabled, to produce a new control signal.

The pulse trains 66, 68 are also applied to the inputs of a no look reset input OR gate 128 which produces an output 130 in response to the presence of a pulse at either input. The output 130 of the OR gate 128 is applied to a single shot circuit 132 which produces a fixed duration pulse 134 each time the output 130 goes high. This pulse is applied to the set input 122S of the no look reset latch 122 to produce an output 135 which is applied to one input of a no look reset AND gate 136. The no look reset latch 122 is reset in response to the output 121 of the control selection OR gate 120 to preclude reset of the control system 10 whenever a selection signal is produced. The other input to no look reset AND gate 136 is the output 113 of no look control AND gate 112, which is also applied to OR gate 138 to produce reset signal 110.

The increase control selection signal 82 is applied to one input of each of four increase enable AND gates 140, 142, 144, 146, each of which produce an enabling signal when a signal is applied to both inputs thereof.

The decrease selection signal 84 is applied to one input of each of four decrease enable AND gates 148, 150, 152, 154, each of which produce an enabling signal when both inputs thereto receive a signal.

Since the control system 10 is designed to produce changes in control signals for effecting incremental adjustments in the operation of the dependent hydraulic motor 16, the changes in control signals are made only one step at a time. Thus, for example, if an existing control signal is a phase 1 signal 52, any change produces a phase 2 signal 54, if the speed of the dependent motor 16 is to be increased or a phase 4 signal 58, if the speed of the dependent motor 16 is to be decreased.

Similarly, if the existing control signal is phase 2 signal 54, an increase in speed will be effected by producing a phase 3 control signal 56, and a decrease in speed will be effected by initiating a phase 1 control signal 52.

The other input to each of the enabling AND gates 140-154 is one of the control signals 52, 54, 56, 58. Thus the second input to the phase 1 increase enabling AND gate 140 is the phase 4 control signal 58; and the second input to the phase 1 decrease enabling AND gate 148 is the phase 2 control signal 54. Similarly, the inputs to the increase speed AND gates 142, 144, 146 for the phase 2, phase 3 and phase 4, respectively, are the phase 1, phase 2, and phase 3 control signals 52, 54, 56, respectively. In a like manner, the second inputs to the decrease speed enabling AND gates 150, 152, 154 for phase 2, phase 3 and phase 4 respectively, are the phase 3, phase 4 and phase 1 control signals 56, 58, 52, respectively.

It can be appreciated, therefore, that only one increase enabling AND gate and one decrease enabling AND gate receive a feedback input, i.e., the existing control signal. Since the increase and decrease control selection signals 82, 84 are produced alternatively, only one of the two AND gates produces an enabling signal in response to the application of either the increase speed control selection signal 82 or the decrease speed control selection signal 84.

The outputs of each pair of AND gates 140 and 148, 142 and 150, 144 and 152, 146 and 154, are applied through a corresponding enabling OR gate 156, 158, 160, 162 to the set input 164S, 166S, 168S, 170S of a corresponding one of the control signal triggered flip flops 164, 166, 168, 170. The trigger signal for all of the triggered flip flops is the output 98 of the trigger AND gate 126 which, when applied to the trigger input 164T, 166T, 168T, 170T produces an output from only that flip flop having a signal applied to its gate input.

The control signals 52, 54, 56, 58 produced by each of the triggered flip flops 164, 166, 168, 170, in addition to being fed back to enable a pair of increase and decrease AND gates as described above, is applied through a transister amplifier 172 to a corresponding one of a plurality of stepping motor field coils 174, 176, 178, 180. Each of the control signals 52-58 is also applied through a delay circuit 182, 184, 186, 188 to a reset single shot 190, 192, 194, 196. The outputs 198, 200, 202, 204 of each of the reset single shots 190, 192, 194, 196, respectively, is applied to the reset inputs of the adjacent gated flip flops through corresponding reset OR gates 206, 208, 210, 212 to reset whichever one of those flip flops had previously been producing a control signal.

The control system of the present invention also includes a power on reset 100 which includes a first single shot 214 which is energized each time the power switch 215 is closed to energize the system. The output 102 of the single shot 214 is applied through OR gate 216 to the reset input of the no look set latch 118, to an inhibit input of the trigger AND gate to the reset input of the no look circuit 114, through each of the control reset OR gates 208, 210, 212 to the reset input of the phase 2, phase 3 and phase 4 gated control flip flops 166, 168, 170 and to the enable OR gate 156 to produce the enable signal 88 to the input of the phase 1 flip flop 164. The pulse 102 is also applied through a delay circuit 218 to trigger a second single shot 220. The second single shot 220 produces a pulse 104, which terminates prior to the termination of the first single shot pulse 102.

The pulse 104 is applied to the reset latch reset input OR gate 120 to reset the no look reset latch 122, to the reset OR gate 138 to produce reset signal 110 for the control signal selection circuits 106, 108, and through the trigger input OR gate 222 to the trigger input of the phase 1 triggered flip flop 164 to produce a phase 1 control signal 52.

Thus, each time the system is initially energized, a phase 1 control signal 52 is produced. However, since the stepper motor 50 is responsive to changes in the control signals rather than to any particular signal itself, the production of the phase 1 control signal does not automatically initiate an adjustment in the stepping motor, but if it does it is only a one step small incremental adjustment.

A normally closed manual reset switch 223 is connected in series between single shot 214 and power switch 215. Momentary operation of manual reset switch 223 manually initiates the reset cycle described above.

Operation of the system is described in conjunction with the timing diagram of FIG. 4. When the system is energized by closure of the power or iginition switch 215, the first power on single shot 214 produces a 15 millisecond pulse 102 which: (1) resets the no look set latch 118 through the OR gate 216; (2) is applied to an inhibit input of the trigger signal AND gate 126 to preclude production of the trigger signal 98; (3) is applied to the reset inputs of the phase 2, phase 3 and phase 4 triggered flip flops 166, 168, 170 to inhibit the production of and terminate any control signals produced thereby; (4) resets no look control circuit 114; and (5) enables the phase 1 triggered flip flop 164 through the enable OR gate 156.

This 15 millisecond pulse is also applied to the delay circuit 218 which, after an approximate 8 millisecond delay, triggers the second power on single shot 220 to produce the 5 millisecond pulse 104. This second power on pulse 104: (1) resets the no look reset latch 122 through the reset input OR gate 120; (2) resets the selection circuits 106, 108 through OR gate 138; and (3) triggers the phase 1 triggered flip flop 164 through OR gate 222 to produce a phase 1 control signal 52.

The phase 1 control signal 52 is fed back to one input of the phase 2 increase speed enable AND gate 142 and to one input of the decrease speed phase 4 enable AND gate 154. The phase 1 control signal is also applied through the 5 millisecond delay circuit 182 to the single shot 190 to produce a 5 millisecond pulse 198 to reset the phase 2 control flip flop 166 through OR gate 208 and reset the phase 4 triggered control flip flop 170 through OR gate 212. These reset signals have no effect since the flip flops 166, 168, 170 have already been reset as a result by the first power on pulse 102.

The control signal is amplified in the transistor amplifier 172 and applied to the phase 1 field coil 174 within the stepper motor 50, which may result in a one step advance or retard of the stepper motor and corresponding adjustment of the dependent hydrostatic motor 16.

When the monostick control lever is manipulated to operate both hydrostatic motors 14, 16 in the forward or reverse direction together, the motors rotate the drive shaft 42, 44 the power track drive sprockets 46, 48 and the transducer discs 70, 72 to produce the independent and dependent pulse trains 66, 68, respectively.

For illustrative purposes, the first pulses of the pulse trains are shown in overlapping relationship with the pulse from the dependent transducer 64 occurring before the pulse from the independent transducer 62. When the first dependent pulse 68a is applied to the input of the control signal selection circuit 80, the increase selection circuit 106 is set. When the pulse 66a from the independent transducer 62 is applied to the input of the selector circuit 80, the trigger input of the increase selection circuit 106 is activated to produce an increase selection signal 82. Since, as explained above, the control systems initially produce phase 1 control signal 52, only the phase 2 increase AND gate 142 that has signals at both inputs, and the enabling output 90 is produced.

The selection circuit 80 continues to produce the forward selection signal 82 until reset. The selection circuit is reset by an output of AND gate 112 which is produced in the absence of pulses in both pulse trains 66, 68. Upon termination of the first dependent pulse 68a, and before termination of pulse 66a, an output 224 from the trigger OR gate 226 is applied to the enabling input of the trigger AND gate 126 to produce a trigger signal 98 since the initial reset pulse 102 has terminated, and the no look signal 124 has not yet been produced.

The trigger output 98 of the trigger AND gate 126 is applied to the trigger input of all four control flip flops 164, 166, 168, 170. However, since only the phase 2 control flip flop 166 is enabled, only a phase 2 control signal 54 is produced. The phase 2 control signal 54 is applied through one of the transistor amplifiers 172 to the phase 2 field coil 176 of the stepper motor 50 to effect the desired incremental adjustment of the swash plate connected thereto, which occurs when phase 1 flip flop is reset.

The phase 2 control signal 54 is also applied to one input of the phase 1 decrease enabling AND gate 148 and to the phase 3 increase enabling AND gate 144. As a result, AND gate 144 is responsive to the next succeeding increase selection signal 82 and AND gate 148 is responsive to the next decrease selection signal 84, respectively. The phase 2 control signal 54 also is applied to delay circuit 184 and single shot 192 to produce a reset pulse 200 which is applied through the reset OR gate 206 to reset the phase 1 flip flop 164 thus terminating the phase 1 control signal 52.

In order to minimize the number of control signal changes that occur, the control system 10 is designed to change the control signal only when overlapping pulses in pulse trains 66, 68 are received after non-overlapping pulses are received. Thus, the selection signal 82 is also applied to OR gate 120 to apply a pulse 121 at the reset input of the no look reset latch 122. The output 121 of the reset OR gate 120 is also applied to the set input of the no look set latch 118 to produce no look set signal 116. The no look set latch 118 continues to produce the no look set output 116 until a reset pulse 228 is applied to the reset input thereof through the no look reset OR gate 216.

Upon termination of both pulses 66a and 68a, AND gate 112 produces output 113 to reset the selection circuit 80, and to trigger the no look circuit 114. The output 124 of no look circuit 114 is applied to an inhibit input of the trigger AND gate 126 to preclude production of additional trigger signals until such time as the no look circuit 114 is reset.

As seen by reference to FIG. 4, if the next pulses 66b, 68b overlap, a selection signal 82 is produced. However, because the output 124 from the no look circuit is applied to an inhibit input of the trigger AND gate 126, no trigger pulse 98 is produced, and the control signal is not changed.

Each time a pulse is produced by one of the transducers, it is applied through OR gate 128 to single shot 132, the output 134 of which sets the no look reset latch 122. The output 135 of the no look reset latch 122 is applied to the no look reset AND gate 136, the output 228 of which, when produced, resets the no look set latch 118 and, therefor the no look circuit 114. However, the production of the selection signal 82 resets the no look reset latch 122 prior to the output 113 of AND gate 112 to preclude production of a reset signal 228.

When pulses 66c and 68c, which do not overlap, are received, no selection signal is produced. The no look reset latch 122, set in response to the occurance of pulse 68c continues to apply reset signal 135 to one input of the reset AND gate 136. Upon termination of both pulses 66c and 68c, AND gate 112 produces output 113, applied to the second input of the no look reset AND gate 136 to produce an output 228. The output 228 resets the no look set latch 118 and the no look circuit 114 thereby terminating the inhibit input 124 to the trigger AND gate 126. The next time overlap occurs, when pulses 66e and 68e are received, a selection signal 82 is produced, and a new control signal 56 produced is to increase the speed of the dependent hydrostatic motor 16.

For clarity, FIG. 4 also shows the sequence of operation for production of selection signal 84 in response to pulses 66h and 68h.

If the monostick is positioned to operate the two motors 16, 18 differently, e.g., to turn the vehicle, monostick switch 230 is closed to apply a continuous reset signal 110 to the selection circuits 106, 108 thereby precluding production of selection signals and inhibiting changes in control signals.

Thus, there has been provided a digital control circuit for producing control signals to effect incremental adjustments to independent operating systems until desired conditions of operation are achieved. The control system compensates for any mechanical adjustments, hydraulic mismatches, load differences, variations in wear, or parts replacements that may occur in either of the systems, allows the utilization of two independent systems for the flexibility that such independent systems provide and yet simultaneously provides accurate and incremental control of the independent systems for operations of the systems in synchronism.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. In an implement having a plurality of drive motor means, a plurality of driven members coupled to and driven by said drive motor means, and actuator means selectively operating said drive motor means to drive said driven members;
   a digital control system enabled in response to operation of said actuator means to operate said drive motor means in synchronism for producing selected control signals to effect incremental adjustment of the operation of at least a first one of said drive motor means relative to the operation of a second one of said drive motor means to achieve said synchronized operation thereof, said control system comprising:
   control circuit means for selectively producing different ones of a plurality of possible control signals and for applying said control signals to said first drive motor means to effect an incremental adjustment of the operations thereof relative to said second drive motor means;
   transducer means for producing a plurality of pulse trains in response to operation of said drive motor means, the relationship between individual pulses of said pulse trains being indicative of the operational relationship between said drive motor means;
   selection circuit means responsive to said pulse trains for producing a first selection signal in response to a first relationship between individual pulses of said pulse trains;
   enabling circuit means for producing an enabling signal in response to said selection signal to enable said control circuit for production of a selected control signal; and
   trigger circuit means responsive to said pulse trains for producing a trigger signal;
   said enabled control circuit producing said selected control signal in response to said trigger signal.

2. In an implement as claimed in claim 1, wherein:
   said selection circuit means is responsive to said pulse trains for producing a second selection signal in response to a second relationship between individual pulses of said pulse trains;
   said enabling circuit means producing another enabling signal in response to said other selection signal to enable said control circuit for production of a different selected control signal.

3. In an implement as claimed in claim 2 including:
   means for applying said selected control signal to said enabling circuit means, said enabling circuit means being responsive to said selected control signal and to said first selection signal for producing a second enabling signal and responsive to said control signal and said second selection signal for producing a third control signal.

4. In an implement as claimed in claim 1 including:
   control reset circuit means responsive to said control signal for terminating previously existing control signals.

5. In an implement as claimed in claim 1 including:
   additional circuit means responsive to said selection signal for producing an inhibit signal;
   said trigger circuit terminating production of additional trigger signals in response to said inhibit signal.

6. In an implement as claimed in claim 5 wherein:
   said additional circuit means is responsive to said pulse trains for terminating said inhibit signal in the absence of said selection signal.

7. In an implement as claimed in claim 2 wherein:

said transducer means produces a first pulse train representative of the operation of said first drive motor means and produces a second pulse train representative of the operation of said second drive motor means.

8. In an implement as claimed in claim 7 wherein:

said selection circuit means is responsive to individual pulses in said first and second pulse trains for producing said first selection signal in response to overlapping pulses in which commencement of a pulse in said second pulse train occurs after commencement of a pulse in said first pulse train and prior termination thereof and for producing said second selection signal in response to overlapping pulses in which commencement of a pulse in said first pulse train occurs after commencement of a pulse in said second pulse train and prior to termination thereof.

9. In an implement as claimed in claim 8 wherein:

said enabling means includes first and second gate means for each of said plurality of possible control signals, means for applying said first selection signal to each of said first gate means, means for applying said second selection signal to each of said second gate means;

and means applying each of said control signals to a different first gate means and to a different second gate means, whereby both a control signal and a selection signal is applied to only one of said first gate means or one of said second gate means, each of said gate means producing an enabling signal in response to both a selection signal and a control signal.

10. An incremental digital control system for producing control signals to effect incremental adjustments of selected controllable operational characteristics of operating systems, comprising:

first circuit means for determining a selected operational characteristic of each of a plurality of operating systems and for producing digital signals representative thereof;

second circuit means for producing control selection signals and selectively responsive to said digital signals for producing one of said control selection signals;

third circuit means for producing control enabling signals and selectively responsive to said one control selection signal for producing one of said control enabling signals;

fourth circuit means selectively responsive to said digital signals for producing a trigger signal; and fifth circuit means for producing control signals and selectively responsive to said one enabling signal and to said trigger signal for producing a selected one of said control signals, whereby said operational characteristic of at least one of said operating systems is incrementally adjusted in response to said selected one of said control signals.

11. An incremental digital control system as claimed in claim 10 including:

sixth circuit means responsive to said selected one of said control signals for producing a control reset signal;

said fifth means being responsive to said control reset signal for terminating non-selected ones of said control signals.

12. An incremental digital control system as claimed in claim 11 including:

seventh circuit means responsive to energization of said control system for producing an initial enabling signal and an initial trigger signal;

said fifth means being responsive to said initial enabling and trigger signals for producing a preselected one of said control signals.

13. An incremental digital control system as claimed in claim 12 wherein:

said seventh circuit means produces an initial reset signal;

said fifth circuit means being responsive to said initial reset signal for terminating all control signals other than said preselected one of said control signals.

14. An incremental digital control system as claimed in claim 13 wherein:

said fourth means is responsive to said initial reset signal for inhibiting production of said trigger signal.

* * * * *